United States Patent [19]

Olschewski

[11] 4,097,318
[45] Jun. 27, 1978

[54] METHOD FOR SEALING PLASTIC-METAL LAMINATES

[75] Inventor: Hans Joachim Olschewski, Berlin, Germany

[73] Assignee: FKF Berlin Fleischwaren-und Konserven- Fabrik Schulz & Berndt GmbH and Co., KG, Germany

[21] Appl. No.: 684,942

[22] Filed: May 10, 1976

[30] Foreign Application Priority Data

May 9, 1975 Germany .................. 2521234
Aug. 26, 1975 Germany .................. 2538316

[51] Int. Cl.² .......................................... B29C 27/00
[52] U.S. Cl. ................................. 156/69; 53/39; 93/DIG. 1; 100/93 P; 100/281; 100/272; 156/182; 156/583; 156/306; 426/398
[58] Field of Search .............. 156/69, 358, 182, 359, 156/285, 366, 292, 583, 306; 219/243; 93/DIG. 1; 100/93 P, 281, 272; 53/39, 329; 74/520; 220/359; 426/398; 229/3.5 R, 5.5

[56] References Cited

U.S. PATENT DOCUMENTS

| | | | |
|---|---|---|---|
| 905,601 | 12/1908 | Sperber | 100/272 |
| 2,310,556 | 2/1943 | Strong | 100/281 |
| 2,344,114 | 3/1944 | Seogwick | 100/272 |
| 2,369,362 | 2/1945 | Martiani | 74/520 |
| 2,412,924 | 12/1946 | Stover | 100/281 |
| 3,000,429 | 9/1961 | Warnken | 100/272 |
| 3,103,701 | 9/1963 | Calchers et al. | 100/272 |
| 3,177,106 | 4/1965 | Seerluth et al. | 156/306 |
| 3,657,055 | 4/1972 | Nichols | 156/583 |
| 3,817,801 | 6/1974 | Widmer | 156/69 |

*Primary Examiner*—David Klein
*Assistant Examiner*—J. J. Gallagher

[57] ABSTRACT

A sealing apparatus for joining container parts of a plastic-lightweight metal foil laminate by heat and pressure applied to the laminates when the respective plastic layers are pressed into contact uses a toggle linkage and a yieldable buffer, with a hydraulic actuator to drive the toggle linkage to close a pair of sealing heads together. The toggle linkage permits build-up of pressure to a value predetermined by the construction of the buffer, after which the buffer yields to hold the sealing pressure. The duration of the build-up to sealing pressure comprises no more than 20% of the time interval between initiation of pressure build-up and the start of pressure drop-off at the end of the sealing process.

5 Claims, 3 Drawing Figures

U.S. Patent June 27, 1978 4,097,318
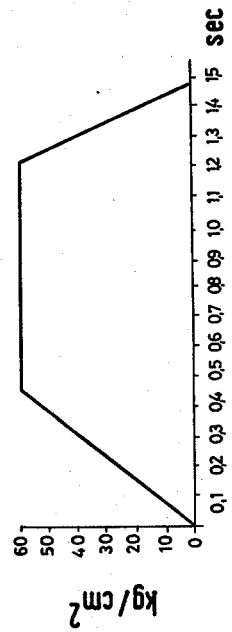
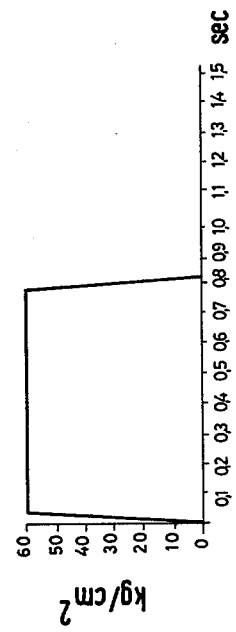
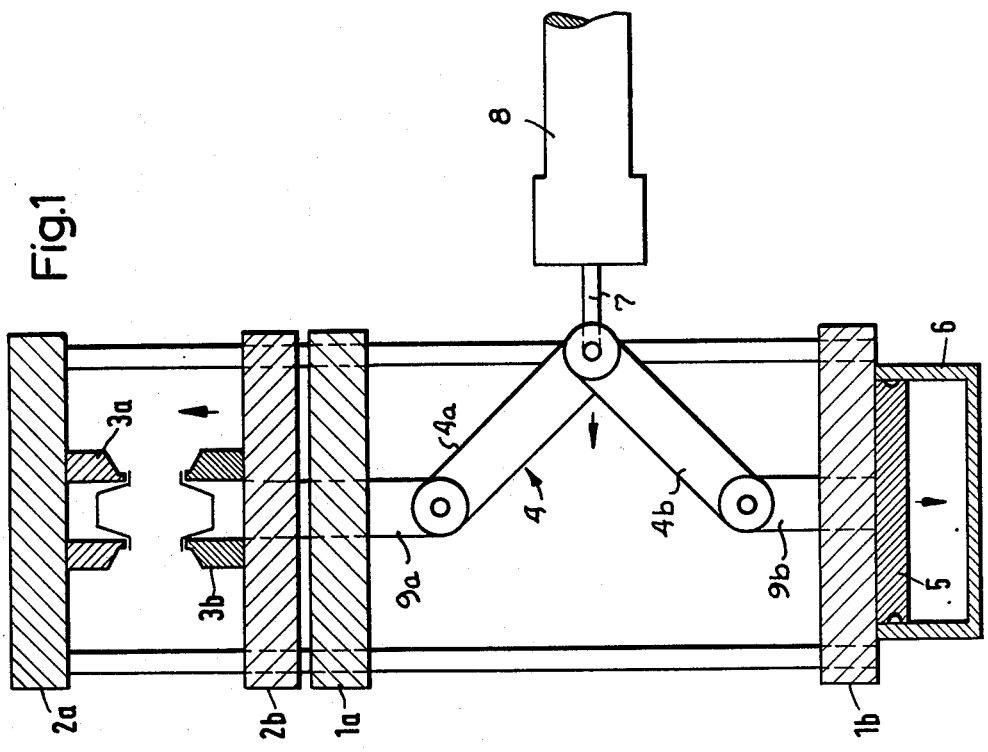

METHOD FOR SEALING PLASTIC-METAL LAMINATES

BACKGROUND OF THE INVENTION

The invention relates to a method of and an apparatus for sealing plastic-metal laminates, and more particularly to the hermetic sealing of light, metal containers coated with a plastic material.

The use of lightweight containers, particularly the use of relatively large containers having a capacity of more than 1 liter, is becoming increasingly accepted in the field of preserving food by heat sterilization in metal containers. Containers of this type consist of a lightweight metal foil coated with a heat-sealable plastic material, such as polypropylene or other similar materials. The hermetic sealing of containers of this type is achieved by joining the edge of the lid to the rim of the container in such a way that the two plastic layers are homogenously joined to one another by applying a suitable temperature and a suitable pressure for a suitable length of time.

With heat seals of this type, it is necessary to seal a relatively large surface which has often been contaminated during the filling procedure by the goods to be preserved. Because of the working cycle time, the rim can only be quickly wiped by the operating personnel, so that at least some moisture is still present on the hydrophobic surfaces to be heat-sealed. Heat-sealing can only be made satisfactory if close tolerances of the temperature, pressure and time are maintained. With smaller containers, these parameters are particularly critical. It must be possible to adjust the relevant values as well as to measure them, and the values, once set, must not change since even a very minor defect in the heat-seal seam inevitably results in spoilage of the goods. The number of faulty products may build up to a very considerable extent, with obvious disadvantageous consequences, before such defects are found.

As to the actual sealing pressure and temperature, it is essential in this connection that the values determined to be optimum are continuously maintained, and that in view of the variations within the limits of tolerance of the thickness of the lightweight, metal sheet material and the plastic coating, it must be possible to readjust the values of these parameters. This can be effected by respective control means depending on the determined variations within the range of tolerance.

Control of the temperature does not pose any particular problems since a fine adjustment can be set by appropriately arranged temperature probes. However, the pressure conditions and the time factors, namely, the duration of application of the actual sealing pressure, as well as the length of time which is required for build-up of this heat-sealing pressure and for the subsequent restoration of the normal pressure, are particularly critical. Within a possible range of sealing pressures, which depends on the type of plastic material and on the temperature, the higher the pressure, the shorter is the sealing time and the more effectively will contaminations from the filling procedure, present on the seal surfaces, be forced out of the seal zone. Moreover, the time required for build-up of the full sealing pressure should not be more than 20% of the total sealing time. The sealing time is to be understood as the total interval between the beginning to the end of contact between the upper and the lower sealing dies while the surfaces to be heat-sealed are interposed.

It is known to apply the pressure forces required to meet these demands, by means of fluids or by a cam mechanism.

Pneumatic application of the sealing pressure by means of a gas, such as air, has the disadvantage of a slow build-up of pressure as a result of the compressibility of the gas. Residues of the goods being filled are thus not sufficiently reliably squeezed from the seal surface and may bake onto the plastic, thus making the hermetic sealing impossible.

The sealing time is set by means of a time switch, which in turn controls a valve to reverse the pressure cylinder after the set time. Since devices of this type are always subjected to high, relative, atmospheric humidities, the formation of condensation in the air system cannot be prevented. After a time, switching inaccuracies will occur for this reason, so a reproducible sealing time cannot be guaranteed. Since the pressure cylinder has to be filled twice for each sealing step, a high consumption of air also results and, furthermore, pressure fluctuations in the compressed air system lead to varying sealing pressures.

Hydraulic application of the sealing pressure has substantially the same disadvantages as pneumatic application, with the exception of those which are ascribed to the compressibility and to the formation of condensation. Even here, a relatively slow build-up of pressure results, and it has already been pointed out that this is a critical parameter. Additionally, switching inaccuracies can easily occur in the hydraulic valves.

Application of the sealing pressure by means of a cam mechanism, using cam discs or cam cylinders, will result in a rapid build-up of pressure. However, since the upper and lower sealing dies must be sprung by means of discs, screws or rubber springs, the sealing pressure can be set to a definite required value only with difficulty. After a certain time, the spring elements suffer fatigue, so that the conditions move out of the critical pressure range.

In the art, a quite considerable number of defective seals still occur with preserving containers having capacities over 1 liter, despite the optimization of the duration of sealing pressure and the values of the sealing pressure and the temperature and despite appropriate readjustment of the relevant values. After some time, this manifests itself in so-called "flippers"; that is to say, the seals are not hermetic and result in spoilage of the contents.

A technological solution of such problem has now, in surprising manner, been rendered possible by the finding that there obviously exists a fourth, critical parameter in the sealing process which has not been earlier recognized. This fourth parameter is the time period between the initial application of the pressure until the actual sealing pressure has been established.

Lengthy investigations have shown that the period of pressure build-up to the actual sealing pressure should not be longer than 20% of the period during which the sealing pressure is applied, and preferably should be substantially less. In particular, this time period should be less than 10%, and preferably be within the range of 3%-5%.

Holding the duration of pressure build-up to the sealing pressure within the preferred range results in particularly reliable sealing. The percentage of rejects in comparison with a process where the time interval of pressure increase is outside of the inventive range, is lower by at least the order of a power of ten.

SUMMARY OF THE INVENTION

It is an object of the invention to provide a method and apparatus for carrying out the sealing operation in such a way that the parameters required for perfect heat-sealing can be determined and always be reproducibly achieved.

Another object of the invention is to provide a method and apparatus wherein the parameter of rapid build-up of the pressure to a predetermined value as necessary for perfect heat-sealing is achieved reliably and independently of exterior influence in an always-reproducible manner.

According to one aspect of the present invention, we provide a method of sealing together the plastic layers of plastic-metal laminates, comprising applying heat to the laminates while pressing together the plastic surfaces to be sealed, wherein the pressure is built up to a sealing pressure during the interval which is no more than 20% of the interval between the initiation of the build-up of sealing pressure and the beginning of pressure drop-off from sealing pressure at the end of the sealing period.

According to a second aspect of the invention, we provide an apparatus for sealing together the plastic layers of plastic-metal laminates, comprising first and second sealing heads carrying respective sealing dies, and means for closing the sealing dies, wherein the die closing means comprises a hydraulically-actuated toggle mechanism hinged to one of the sealing heads and to a resilient buffer. The buffer may preferably be a pneumatic cylinder, in which case this cylinder can be supplied from a compressed air bottle, since there is virtually no loss of pneumatic medium. The air bottle preferably is independent of any other compressed air system in the sealing plant.

The advantages obtained from the present invention are, in particular, that the positive kinematics with several adjustable parameters which are created make it possible to build up and decrease the sealing pressure very rapidly, and to set the duration of the sealing pressure accurately without fear of the values, once established, changing over relatively long periods.

BRIEF DESCRIPTION OF THE DRAWINGS

One embodiment of the invention is shown in the accompanying drawings and will, by way of example, be described in more detail in the following text.

In the drawings:

FIG. 1 shows a sectional, diagrammatic representation of the apparatus according to the present invention;

FIG. 2 shows a pressure-time diagram of a prior-art, fluid-operated sealing apparatus; and FIG. 3 shows a pressure-time diagram of the sealing apparatus according to the present invention.

DETAILED DESCRIPTION OF THE PREFERRED EMBODIMENT

The apparatus according to the present invention comprises an upper frame member 1a, a lower frame member 1b, an upper sealing head 2a carrying the upper sealing die 3a, and a lower sealing head 2b carrying the lower sealing die 3b.

A toggle mechanism 4 has one lever 4a hinged at its upper end to a compression linkage 9a, which in this drawing is exemplified by a strut slidably guided in the upper frame member 1a and which carries the lower sealing head 2b. Another lever 4b is hinged at its lower end to a linkage 9b, in this case a single strut, which is slidably guided in the lower frame member 1b and is connected to the piston 5 of an air cylinder 6. The air cylinder 6 serves as a closed, pneumatic spring or buffer, and preferably is connected to a source of compressed air, such as a bottle, not shown. This will enable a constant predetermined pressure to be imposed on the piston 5. The levers 4a and 4b making up the toggle mechanism 4 are driven by the translating piston rod 7 of a hydraulic cylinder 8.

In the starting position, the levers 4a and 4b of the toggle mechanism 4 are at an angle of about 45° to the extended, vertical, collinear position. When a working cycle is initiated, the toggle mechanism 4 is extended by leftward movement of the piston rod 7 of cylinder 8, and the lower sealing die 3b rises towards the upper sealing die 3a.

About 15° before the extended, i.e., the vertical, position of the toggle levers the lower sealing die 3b contacts the stationary, upper sealing die 3a. The angle mentioned here is to be understood only as an example, since the arrangement can be set in such a way that contact of the two sealing dies occurs in a range of angles to the toggle levers, preferably from 5° to 20°.

At this point, in time, the actual sealing process begins as a result of a sudden build-up of pressure in the air cylinder 6, which is already under a predetermined preimposed pressure.

Thus, because of the favorable mechanical advantage of the toggle mechanism 4, it is not necessary to allow for a slow build-up of pressure either in the air cylinder 6 or in the hydraulic cylinder 8.

The sealing time continues until the toggle levers 4a and 4b have moved through their extended positions to lever inclinations of about 15° in the other direction. The sealing time is then complete, and the piston 5 of the air cylinder 6 will have returned to its original position. Further extension of the piston rod 7 to its final, fully extended, horizontal position will return the lower sealing die 3b to its starting position, with the levers of the toggle mechanism 4 at about 45° to the extended, collinear or "central" position of the toggle mechanism, in inclinations opposite to those of the initial starting position of the mechanism. The next sealing step is initiated by reversing the hydraulic cylinder 8.

The one-piece piston rod 7 of the hydraulic cylinder 8 is then constructed to present equal piston areas, and hence, the cylinder drives at an equal speed during both forward and reverse movements.

The diagrams in FIGS. 2 and 3 show, on a comparative basis, the pressure increase versus the time according to a similar prior art device and according to the present invention, respectively. In FIG. 2, it can be seen that the ratio of the time period required for the pressure to build to the actual sealing pressure to the time period during which the actual sealing pressure is applied is about 1:2, so that the time period required for establishing the sealing pressure amounts to 30% of the total time period from the beginning of pressure application until the sealing pressure begins to decrease.

In FIG. 3, the pressure-time curve is substantially rectangular, reflecting the time required to establish the sealing pressure, the duration of application of the sealing pressure, and the decrease of the sealing pressure. The time delay until the pressure reaches the actual sealing pressure is only about 5% of the duration time of the sealing pressure. In terms of actual time, the difference between the prior art (FIG. 2) and the present invention (FIG. 3) is in the range of a power of ten.

Of course, numerous modifications and variations of the present invention are possible in light of the above techniques. It is, therefore, to be understood that within the scope of the appended claims, the invention may be practiced otherwise than as specifically described herein.

What is claimed is:

1. A process for sealing the plastic layers of two plastic-metal laminates comprising the steps of:

heating and pressing together the laminates to place the plastic layers of said laminates in contact;

rapidly increasing the pressure to a predetermined value with which the laminates are pressed together;

maintaining the predetermined pressure for a predetermined period; and releasing the pressure from said laminates, wherein the period for rapidly increasing the pressure to the predetermined value is less than 20% of the total interval between the start of pressure increase and the start of pressure release.

2. The process of claim 1, wherein the period in which the pressure is rapidly increased to the predetermined value is less than 10% of the total interval between the start of pressure increase and the start of pressure release.

3. The process of claim 1, wherein the period in which the pressure is rapidly increased to the predetermined value is 3% to 5% of the total interval between the start of pressure increase and the start of pressure release.

4. The process of claim 1, wherein said laminates are each formed with a lightweight, metal layer and a layer of polypropylene.

5. The process of claim 4, wherein said laminates are formed as the closure member and the receiving member of a container.

* * * * *

UNITED STATES PATENT AND TRADEMARK OFFICE
CERTIFICATE OF CORRECTION

PATENT NO. : 4,097,318
DATED : June 27, 1978
INVENTOR(S) : Hans Joachim Olschewski It is certified that error appears in the above-identified patent and that said Letters Patent are hereby corrected as shown below:

In the Abstract, line 7, before "build-up" insert -- rapid --.

Signed and Sealed this

*Nineteenth* Day of *December 1978*

[SEAL]

Attest:

RUTH C. MASON
*Attesting Officer*

DONALD W. BANNER
*Commissioner of Patents and Trademarks*